United States Patent
Goolkasian et al.

(10) Patent No.: US 8,131,598 B2
(45) Date of Patent: Mar. 6, 2012

(54) SYSTEM AND METHOD OF SELECTING FREIGHT FORWARDING COMPANIES

(75) Inventors: Gregory Goolkasian, Southbury, CT (US); Kevin Kelleher, Brookfield, CT (US)

(73) Assignee: Cartus Corporation, Danbury, CT (US)

( * ) Notice: Subject to any disclaimer, the term of this patent is extended or adjusted under 35 U.S.C. 154(b) by 1244 days.

(21) Appl. No.: 10/819,813

(22) Filed: Apr. 7, 2004

(65) Prior Publication Data

US 2005/0060244 A1    Mar. 17, 2005

Related U.S. Application Data

(60) Provisional application No. 60/502,487, filed on Sep. 12, 2003.

(51) Int. Cl.
*G06Q 30/00* (2006.01)
(52) U.S. Cl. .................... 705/26.3; 705/26.41
(58) Field of Classification Search .............. 705/26, 705/27, 5, 6, 37, 26.3, 26.41
See application file for complete search history.

(56) References Cited

U.S. PATENT DOCUMENTS 5,917,897 A  *  6/1999  Johnson et al. .......... 379/114.02
(Continued)

FOREIGN PATENT DOCUMENTS

WO    WO-0180111 A1  *  10/2001

OTHER PUBLICATIONS

Paege, B., "Too Many Trucks Chasing too Little Freight," Alberta Business, vol. 7, No. 5, p. 6.*

(Continued)

*Primary Examiner* — Nicholas D Rosen
(74) *Attorney, Agent, or Firm* — Lerner, David, Littenberg, Krumholz & Mentlik, LLP

(57) ABSTRACT

A system and method for selecting freight forwarding companies are provided wherein bids for shipping lanes and the like are received well in advance of a freight move. Bids are submitted on shipping lanes and other move associated transactions by pre-approved freight forwarding companies. This information is stored in a database. Selection of the freight forwarding company or companies occurs in connection with evaluating the bid information submitted and historical data stored on the database.

6 Claims, 10 Drawing Sheets

U.S. PATENT DOCUMENTS

| | | | |
|---|---|---|---|
| 6,064,981 A * | 5/2000 | Barni et al. | 705/26 |
| 6,219,653 B1 * | 4/2001 | O'Neill et al. | 705/400 |
| 6,321,207 B1 * | 11/2001 | Ye | 705/8 |
| 6,915,268 B2 * | 7/2005 | Riggs et al. | 705/7 |
| 7,110,976 B2 * | 9/2006 | Heimermann et al. | 705/37 |
| 7,249,087 B2 * | 7/2007 | Sharp et al. | 705/37 |
| 7,395,237 B1 * | 7/2008 | Hall et al. | 705/37 |
| 7,565,314 B2 * | 7/2009 | Borgeson et al. | 705/37 |
| 7,698,204 B2 * | 4/2010 | Abendroth | 705/37 |
| 7,711,629 B2 * | 5/2010 | Laurent et al. | 705/37 |
| 7,783,557 B2 * | 8/2010 | Laurent et al. | 705/37 |
| 2001/0047284 A1 * | 11/2001 | Blalock et al. | 705/8 |
| 2002/0049642 A1 * | 4/2002 | Moderegger et al. | 705/26 |
| 2002/0116318 A1 * | 8/2002 | Thomas et al. | 705/37 |
| 2002/0188517 A1 * | 12/2002 | Banerjee et al. | 705/26 |
| 2003/0236739 A1 * | 12/2003 | Borgeson et al. | 705/37 |
| 2005/0209913 A1 * | 9/2005 | Wied et al. | 705/12 |
| 2006/0059023 A1 * | 3/2006 | Mashinsky | 705/5 |
| 2007/0192111 A1 * | 8/2007 | Chasen | 705/1 |
| 2010/0017273 A1 * | 1/2010 | Hommrich et al. | 705/10 |

OTHER PUBLICATIONS

Anon., "Chuan Hup Pumping $200m into Logistics," Business Times, p. 4, Oct. 3, 2000.*

Anon., "CombineNet Technology Enables Bayer Corporation to Achieve Maximum Savings in Global eSourcing," PR Newswire, Apr. 10, 2003.*

* cited by examiner

FIG. 4

POINT-TO-POINT RATES

Company: Interdean.Interconex (IDX) User:Jim
Rates for contract with: Cendant Mobility effective from 10/21/2002 through 10/21/2050
Rates entered today will be frozen until 7/29/2003

◉ New Rate Requests  ○ Unfrozen Rates  ○ Expired Rate Requests (Never Submitted)

Transportation Method  [Air ▷]  Channel  [Appleton WI United States-To Dublin, Ireland ▷]

| Measurement | Transit Period | | Effective Dates | | Rate:c/f-US$ |
|---|---|---|---|---|---|
| 22 c/f | ☐ to ☐ [Days ▷] ⇨ | | 7/29/2003 - 10/21/2050 | | $ ☐ |
| 43 c/f | ☐ to ☐ [Days ▷] | | 7/29/2003 - 10/21/2050 | | $ ☐ |
| 65 c/f | ☐ to ☐ [Days ▷] | | 7/29/2003 - 10/21/2050 | | $ ☐ |
| 106 c/f | ☐ to ☐ [Days ▷] | | 7/29/2003 - 10/21/2050 | | $ ☐ |
| 154 c/f | ☐ to ☐ [Days ▷] | | 7/29/2003 - 10/21/2050 | | $ ☐ |
| 212 c/f add new... | ☐ to ☐ [Days ▷] | | 7/29/2003 - 10/21/2050 | | $ ☐ |

[Submit Rates]

MAIN | SFR RPT. | CITY RATES | CITY RPT. | CONTACTS | SERVICE AREA | RULES | ACCOUNT MGT | SUPPORT | HELP

FIG. 5

POINT-TO-POINT RATES

- MAIN
- SFR RPT.
- CITY RATES
- CITY RPT.
- CONTACTS
- SERVICE AREA
- RULES
- ACCOUNT MGT
- SUPPORT
- HELP

Company: Interdean.Interconex (IDX) User: Jia
Rates for contract with: Cendant Mobility effective from 10/21/2002 through 10/21/2050
Rates entered today will be frozen until 7/29/2003

◉ New Rate Requests  ○ Unfrozen Rates  ○ Expired Rate Requests (Never Submitted)

Transportation Method                    Channel
[Surface Loose Load ▼]   [-select- ▼]

| Measurement | Transit Period | Effective Dates | Rate: cwt-US$ |
|---|---|---|---|
| 1000 lbs | ☐ to ☐ [Days ▼] ⇨ | 7/29/2003 - 10/21/2050 | $ |
| 2000 lbs | ☐ to ☐ [Days ▼] | 7/29/2003 - 10/21/2050 | $ |
| 3000 lbs | ☐ to ☐ [Days ▼] | 7/29/2003 - 10/21/2050 | $ |
| 4000 lbs | ☐ to ☐ [Days ▼] | 7/29/2003 - 10/21/2050 | $ |
| 5000 lbs | ☐ to ☐ [Days ▼] | 7/29/2003 - 10/21/2050 | $ |
| 6000 lbs | ☐ to ☐ [Days ▼] | 7/29/2003 - 10/21/2050 | $ |
| 7000 lbs | ☐ to ☐ [Days ▼] | 7/29/2003 - 10/21/2050 | $ |
| 8000 lbs | ☐ to ☐ [Days ▼] | 7/29/2003 - 10/21/2050 | $ |
| 9000 lbs | ☐ to ☐ [Days ▼] | 7/29/2003 - 10/21/2050 | $ |
| 10000 lbs | ☐ to ☐ [Days ▼] | 7/29/2003 - 10/21/2050 | $ |
| 11000 lbs | ☐ to ☐ [Days ▼] | 7/29/2003 - 10/21/2050 | $ |
| 12000 lbs | ☐ to ☐ [Days ▼] | 7/29/2003 - 10/21/2050 | $ |
| 13000 lbs | ☐ to ☐ [Days ▼] | 7/29/2003 - 10/21/2050 | $ |
| 14000 lbs | ☐ to ☐ [Days ▼] | 7/29/2003 - 10/21/2050 | $ |
| 15000 lbs | ☐ to ☐ [Days ▼] | 7/29/2003 - 10/21/2050 | $ |
| 16000 lbs | ☐ to ☐ [Days ▼] | 7/29/2003 - 10/21/2050 | $ |
| 17000 lbs | ☐ to ☐ [Days ▼] | 7/29/2003 - 10/21/2050 | $ |
| 18000 lbs add new... | ☐ to ☐ [Days ▼] | 7/29/2003 - 10/21/2050 | $ |

[Submit Rates]

FIG. 6

Rates for contract with: Cendant Mobility effective from 10/21/2002 through 10/21/2050
Rates entered today will be frozen until 7/29/2003

● Permanent Storage      ○ Additional Service Charges

City Location

| Aberdeen | United Kingdom | New ▼ |

| Measurement | Effective Dates | Cartage to Storage | Cartage from Storage |
|---|---|---|---|
| 1000 CWT | 7/29/2003 - 10/21/2050 | $ | $ |
| 2000 CWT | 7/29/2003 - 10/21/2050 | $ | $ |
| 3000 CWT | 7/29/2003 - 10/21/2050 | $ | $ |
| 4000 CWT | 7/29/2003 - 10/21/2050 | $ | $ |
| 5000 CWT | 7/29/2003 - 10/21/2050 | $ | $ |
| 6000 CWT | 7/29/2003 - 10/21/2050 | $ | $ |
| 7000 CWT | 7/29/2003 - 10/21/2050 | $ | $ |
| 8000 CWT | 7/29/2003 - 10/21/2050 | $ | $ |
| 9000 CWT | 7/29/2003 - 10/21/2050 | $ | $ |
| 10000 CWT | 7/29/2003 - 10/21/2050 | $ | $ |
| 11000 CWT | 7/29/2003 - 10/21/2050 | $ | $ |
| 12000 CWT | 7/29/2003 - 10/21/2050 | $ | $ |
| 13000 CWT | 7/29/2003 - 10/21/2050 | $ | $ |
| 14000 CWT | 7/29/2003 - 10/21/2050 | $ | $ |
| 15000 CWT | 7/29/2003 - 10/21/2050 | $ | $ |

| Measurement | Description | Effective Dates | Rates |
|---|---|---|---|
| CWT | IH6 MONTHLY PERM STORAGE | 7/29/2003 - 10/21/2050 | $ |
| FLAT | AUTO MONTHLY STORAGE | 7/29/2003 - 10/21/2050 | $ |
| FLAT | AUTO ONE-TIME WHSE HANDLING | 7/29/2003 - 10/21/2050 | $ |
| FLAT | AUTO CARTAGE | 7/29/2003 - 10/21/2050 | $ |

[Submit Rates]

- POINT-TO-POINT RATES
- SFR RATES
- SFR RPT.
- CITY RPT.
- CONTACTS
- SERVICE AREA
- RULES
- ACCOUNT MGT
- SUPPORT
- HELP

FIG. 7

Company: Interdean.Interconex (IDX) User:Jim
Rates for contract with: Cendant Mobility effective from 10/21/2002 through 10/21/2050
Rates entered today will be frozen until 7/29/2003

○ Permanent Storage  ● Additional Service Charges

City Location
[Aberdeen] [United Kingdom] [New ▼]

| UOM | Description | Effective Dates | | Rate: |
|---|---|---|---|---|
| FLAT | PIANO-GRAND | 7/29/2003 | - 10/21/2050 | $ |
| CWT | SET ONE-TIME WAREHOUSE HANDLING LOOSE | 7/29/2003 | - 10/21/2050 | $ |
| CWT | STORAGE IN TRANSIT PER MONTH | 7/29/2003 | - 10/21/2050 | $ |
| CWT | SHUTTLE | 7/29/2003 | - 10/21/2050 | $ |
| CE | CRATING-CARRIER | 7/29/2003 | - 10/21/2050 | $ |
| CF | CRATING-3RD PARTY | 7/29/2003 | - 10/21/2050 | $ |
| AT COST + 10% | PARKING PERMIT | 7/29/2003 | - 10/21/2050 | $ N/A |
| AT COST + 10% | HOISTING/CRANE | 7/29/2003 | - 10/21/2050 | $ N/A |
| AT COST + 10% | GERMAN SHRANK SETUP/TAKE DOWN | 7/29/2003 | - 10/21/2050 | $ N/A |
| AT COST + 10% | SWING SETUP/TAKE DOWN | 7/29/2003 | - 10/21/2050 | $ N/A |

[Submit Rates]

POINT-TO-POINT RATES
MAIN
SFR RATES
SFR RPT.
CITY RPT.
CONTACTS
SERVICE AREA
RULES
ACCOUNT MGT
SUPPORT
HELP

FIG. 9

Booking Engine

| | |
|---|---|
| MAIN | |
| BOOKING | |
| SHIPMENTS | |
| CONTACTS | |

Channel: Atlanta, GA United States to Bogota, Colombia
Air Weight: 3000 .lbs
Surface LL Weight: 4000 .lbs
Surface LV Weight: 5000 .lbs
Perm Storage: 36 months
Shipment Date: 8/9/2002
Move Number: 1253719

| | Forwarder | Air | LL | LV | Sub Total ▽△ | Perm Str | Total ▽△ | City ▽△ | Service Stores County ▽△ | Worldwide ▽△ | Claims Frequency | Severity ▽△ |
|---|---|---|---|---|---|---|---|---|---|---|---|---|
| Book | Interconex, Inc. | $3,000.00 | $4,800.00 | $5,000.00 | $12,800.00 | $0.00 | $12,800.00 | 0% | 0% | 0% | 0:0 | $0.00 |
| Book | Asian Tiger | $9,000.00 | $4,100.00 | $3,000.00 | $16,100.00 | $0.00 | $16,100.00 | 0% | 0% | 0% | 0:0 | $0.00 |
| Book | Allied International | $3,100.00 | $4,700.00 | $5,100.00 | $12,900.00 | $0.00 | $12,900.00 | 0% | 0% | 0% | 0:0 | $0.00 |
| Book | Suddath International | $8,000.00 | $7,200.00 | $9,800.00 | $25,000.00 | $0.00 | $25,000.00 | 0% | 0% | 0% | 0:0 | $0.00 |

SYSTEM AND METHOD OF SELECTING FREIGHT FORWARDING COMPANIES

CROSS-REFERENCE TO RELATED APPLICATIONS

This application claims benefit of Provisional Application No. 60/502,487, filed Sep. 12, 2003, the disclosure of which is hereby incorporated by reference herein.

BACKGROUND OF THE INVENTION

Typically, relocation companies are hired by a company (hereafter, the "customer") to help people, such as the customer's employees, relocate to a new home. In this regard, relocation companies typically help the person (hereafter, the "transferee") obtain a fair price for their current home, find a new home, and move the transferee from their point of origin to their point of destination.

Quality relocation companies aim to meet and exceed the expectations of the customers and transferees. For example, when it comes to the move, transferees expect good communication regarding the packing/delivery dates and times. They also expect that the mover will respect their goods, such as providing special care to fragile items, and avoiding damage during packing/unpacking and transportation. Transferees also want the mover to meet their commitments throughout the move, including helping with customs requirements. In addition, transferees expect that the agents at both the origin and destination point will be professional. They also expect that the number of surveyors will be limited. Surveyors generally come to the house to determine the equipment and personnel that will be needed to effect the move. Surveyors also use the information to enable the freight forwarding company to provide an estimate for the cost of the move.

A relocation company often hires one or more freight forwarding companies to perform moves and needs companies that can meet these expectations while also meeting the customer's price requirements. Thus, the relocation company may hire a moving company, preferably an international moving company, to perform freight forwarding services. However, not all freight forwarding companies are the same, and this is particularly so with respect to international shipments that cross a country border (the US and Canadian border typically present less difficulties than other international shipments).

Some freight forwarding companies specialize in particular traffic lanes or channels where a traffic lane or channel includes at least a geographic region (e.g., collection of countries, particular country, collection of cities, a particular city, etc.) that includes the origin of the move and at least a geographic region that includes the destination of the move.

Other differences between freight forwarding companies relate to pricing, because different freight forwarding companies charge different prices. Freight forwarding companies typically charge based on a matrix of shipment types, storage requirements, other services and rate structures. For example, in addition to having different prices for different lanes, the companies may also differ with respect to whether they are charging based on weight, volume, flat fees or some other criteria. Accordingly, the different prices and sometimes rate structures often make it difficult to select a freight forwarding company based on cost.

The quality of service also varies from freight forwarding company to company. A relocation company's past experience with particular freight forwarding companies should also be taken into account when selecting freight forwarding companies, which further complicates the selection process.

There is a need for a system which eases the difficulties and complexities associated with the selection of freight forwarding companies.

BRIEF DESCRIPTION OF THE DRAWINGS

FIG. 4 illustrates a computer screen display for showing lanes, in a drop down box, according to pairs of origin and destination cities.

FIG. 5 illustrates a computer screen display showing weight classes associated with traffic lanes.

FIG. 6 illustrates a computer screen display listing the cost of putting goods into storage based on weight class and the cost of taking goods out of storage based on weight class.

FIG. 7 illustrates a computer screen display showing accessorial rates.

FIG. 9 illustrates a computer screen for use with the booking engine for entering performance feedback information.

Figure 1:
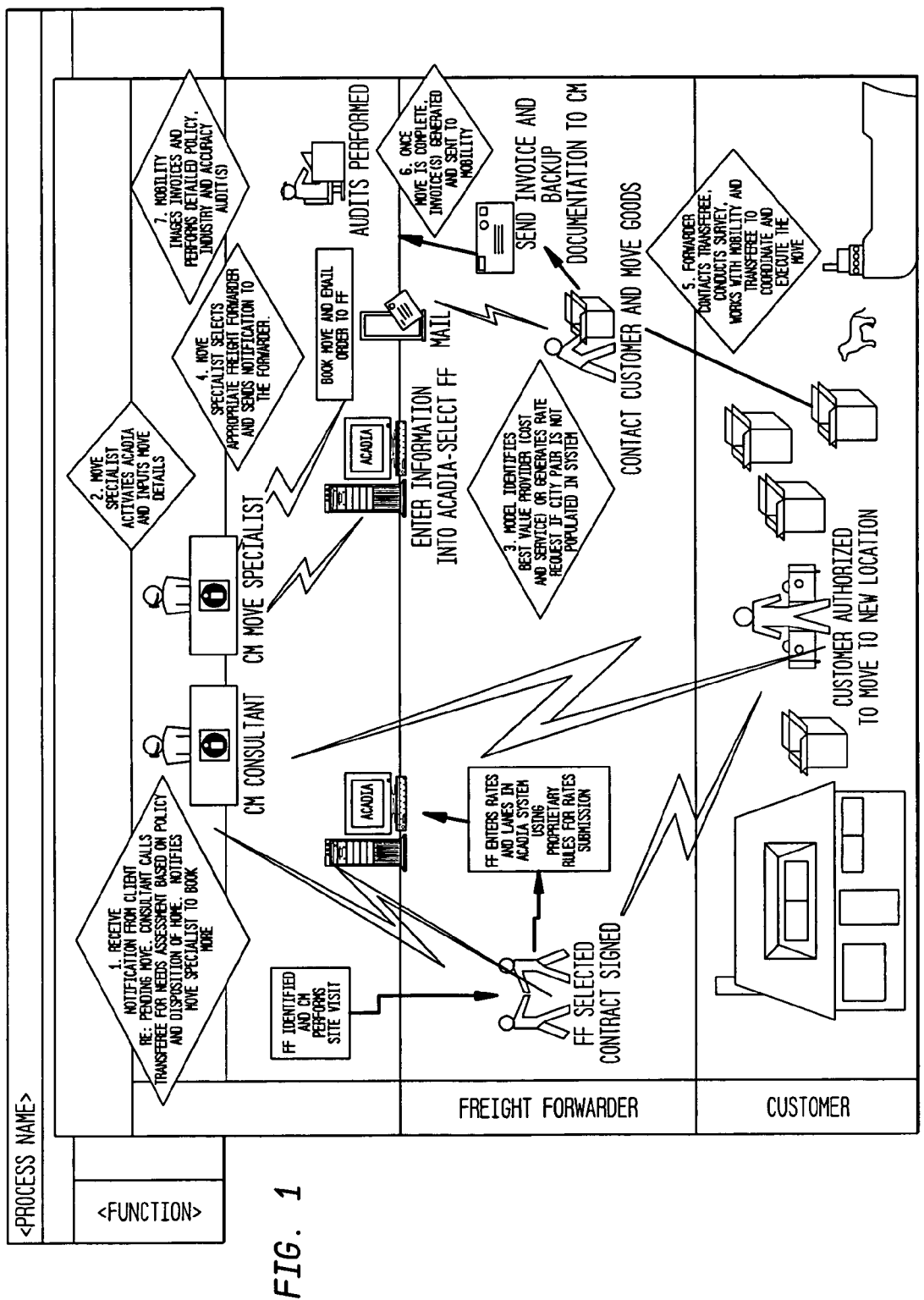
FIG. 1 represents a functional diagram of one aspect of a system and method of the present invention.

Applicable reference numerals have been carried forward.

SUMMARY OF THE INVENTION

The invention provides a method of selecting a freight forwarding company.

According to one aspect of the invention, a method of selecting a freight forwarding company is provided wherein bid information is received from a plurality of freight forwarding companies. The bid information identifies a traffic lane, a moving requirement, and a price rate associated with the moving requirement. A move request is received associated with a traffic lane. Additionally, a moving requirement and a quantity value associated with the moving requirement are received. At least one freight forwarding company is identified based on the freight forwarding company's bid information wherein the traffic lane and a moving requirement of the bid information relate to the traffic lane and a moving requirement of the move request. The method calculates a cost for each of the identified freight forwarding companies dependant on the price rate and quantity value.

According to another aspect of the invention, a method of selecting a freight forwarding company is provided wherein a freight forwarding company participates as a provider of services. The freight forwarding company is subjected to an approval process. The freight forwarding company executes a contract for providing services and a database of approved freight forwarding companies under contract is provided. Traffic lanes for submission of bids by freight forwarding companies under contract are provided as well, as is a database of traffic lanes for bid by the freight forwarding companies. A freight forwarding company is selected using the database of traffic lane bids.

According to another aspect of the invention, a method of conducting a relocation business is provided wherein an order is received from a client for the transfer of property of a transferee. The transferee is consulted and a move of the property is scheduled. Information pertaining to the move is compiled and a database is accessed containing preexisting information including traffic lane bid prices from the freight forwarding companies. A freight forwarding company is selected in conjunction with using the database.

According to another aspect of the invention, a freight forwarding company selection system is provided which includes a freight forwarding company approval procedure and a database including names of and information pertaining to approved freight forwarding companies. The system also includes a freight forwarding company bid procedure and a program which provides a graphic user interface used in connection with viewing the database for use in selecting a freight forwarding company in connection with ranking database information according to a search criteria.

In another aspect of the invention a freight forwarding company selection system is provided which includes a freight forwarding company approval procedure and a database including names of and information pertaining to approved freight forwarding companies. The system also includes a freight forwarding company bid procedure wherein selection of a freight forwarding company is based off of bid information stored in the database for compilation in connection with a search for a freight forwarding company.

DETAILED DESCRIPTION OF THE INVENTION

Among other things, the invention provides a system and method for systemizing bid pricing of freight forwarding companies. For example, instead of forwarders bidding competitively on every shipment, the system and method compares previously submitted bids with a particular move and uses the information to select a freight forwarding company.

Figure 2:
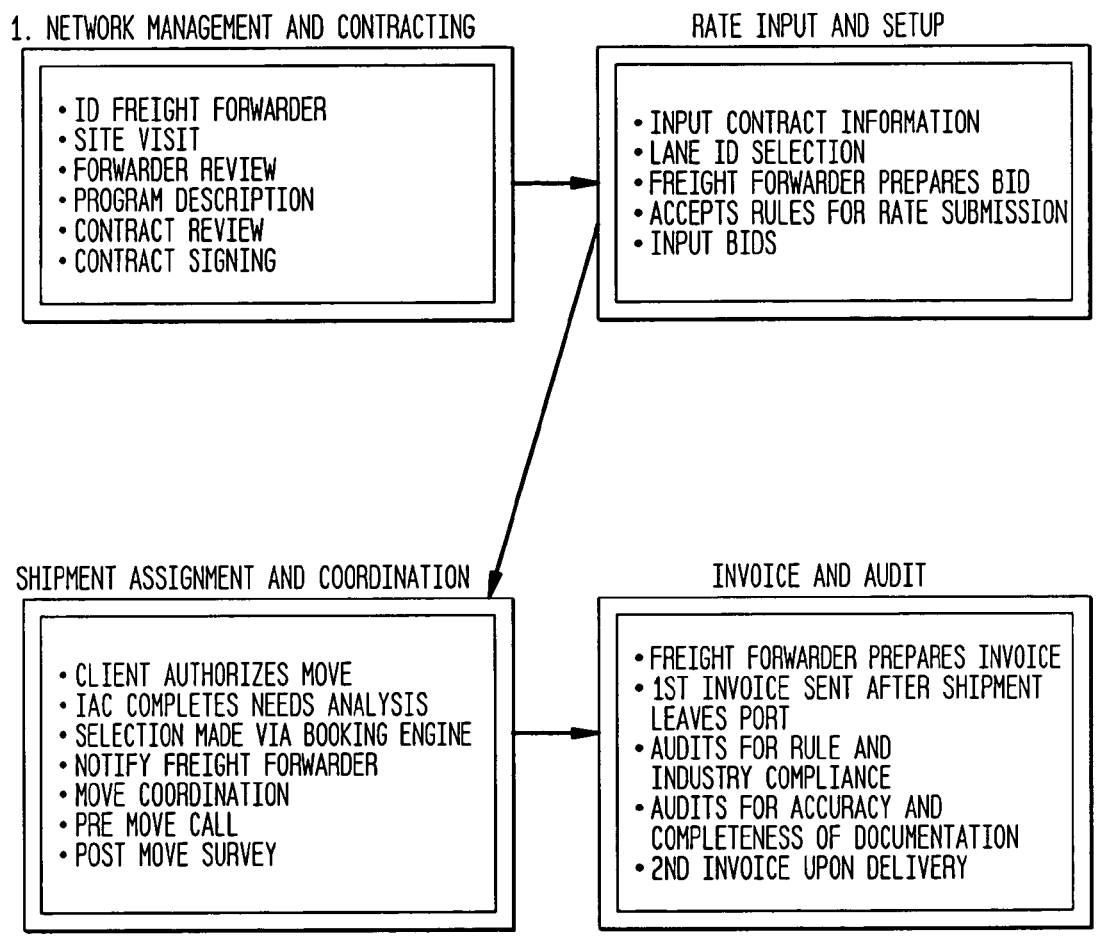
FIG. 2 represents a flow chart of a method in accordance with an aspect of the invention.

An operation in accordance with one aspect of the invention will now be described. The following process represents just one example of a method in accordance with the invention, and other steps and orders of operation are possible. For the purposes of illustration, FIG. 1 represents a functional diagram of one aspect of a system and method of the present invention as implemented on a system to include the invention called Acadia™. FIG. 2 represents a flow chart of a method in accordance with an aspect of the invention.

In operation, the relocation company first identifies and then approves freight forwarding companies to participate in the system. Typically, the approval process will include an on-site visit to the freight forwarding company to check its facilities and discuss the bidding process. The review process may also include performing background checks and the like. If a freight forwarding company is not rejected, the approval process is generally concluded with the execution of a contract between the relocation company and the freight forwarding company.

Once the freight forwarding company is approved by the relocation company, it is added to the list of qualified bidders.

Preferably, the list of qualified bidders is maintained in a computerized database, hereafter referred to as the booking engine database, and the database is maintained via the use of a computer program, hereafter referred to as the booking engine. However, the process may be implemented without a computerized database as well.

Figure 3:
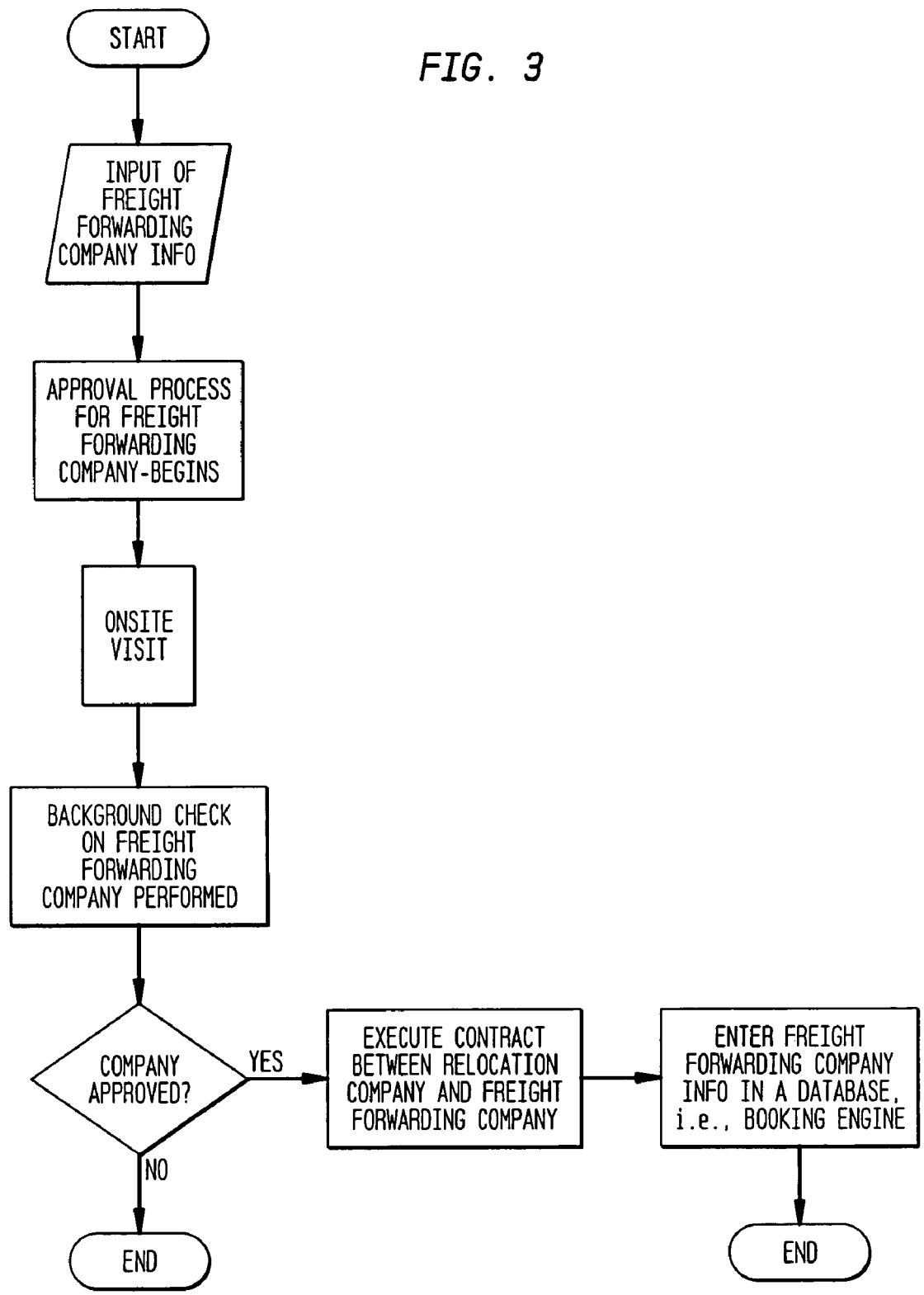
FIG. 3 is a flow chart of the freight forwarding company approval process.

One manner in which the qualified freight forwarding company may be added to the list of approved freight forwarding companies by the relocation company is by adding the freight forwarding company's information, such as its name, address and other information, to the booking engine database and indicating that the company is approved to enter bids. Other information relating to the contract may also be added to the database. FIG. 3 is a flowchart of the freight forwarding company approval process.

After the freight forwarding company is added to the list of approved companies, the freight forwarding company will then bid on traffic lanes. Preferably, the list of traffic lanes will be pre-identified, and the freight forwarding company is not obligated to bid on every pre-identified traffic lane. With respect to the traffic lanes that the freight forwarding company does bid on, it is preferable for the freight forwarding company to bid on all of the potential requirements for a move within that lane. For example, as explained in more detail below, it may bid on how much it charges per pound for surface shipments, how much it charges per cubic foot for air shipments, how much it charges to put goods in storage, etc. Alternatively, the freight forwarding company may bid on only some of the potential requirements for moves within that lane.

The bid is preferably made by providing the freight forwarding company with limited access to the booking engine database via the Internet and web pages. The information for the web page is gathered by the booking engine. In this regard, the freight forwarding company will log onto a web site maintained at the direction of the relocation company and devoted to accepting bids.

Once logged into the web site, the freight forwarding company may then browse a web page containing a list of traffic lanes that are open for bid. As shown in FIG. 4, the lanes may be listed in a drop down box containing pairs of origin and destination cites, such as the lane representing shipments from Appleton, Wis. to Dublin, Ireland.

After selecting a traffic lane, the freight forwarding company will then be presented with web-based controls for entering rate amounts. For example, as shown in FIG. 5, the freight forwarding company will be presented with a list of weight classes associated with that lane. Each weight class represents a range of weight values, such as shipments ranging from 1,000 to 2,000 pounds. The freight forwarding company can then enter the per-pound amount ("CWT" refers to net per 100 pound weight) that it will charge for transporting goods in that weight class for that lane. The booking engine may perform immediate or post-bid validity checks on the entered data, such as ensuring that the price does not exceed a certain range.

FIG. 5 illustrates additional options in connection with the bidding process. For example, the freight forwarding company may enter the expected transit time as a range of days (as shown), weeks or some other time frame. The freight forwarding company may also identify the period of time over which the rates will be effective. The freight forwarding company may also indicate whether the rates are newly entered, unfrozen (meaning that the freight forwarding company is reserving the right to change the rates during the effective date period) or expiring (meaning that the prices will need to be updated).

As also shown in FIG. 5, the freight forwarding company preferably indicates the manner in which the goods will be shipped. For example, all of rates in the example of FIG. 5 relate to surface shipments. The freight forwarding company can select among different surface transportation methods for the goods, such as "surface loose load (LL)" or "lift van (LV)", and bid on each method.

Returning to FIG. 4 an exemplary screen is provided for bidding on moves that require air shipments. The freight forwarding company selects a particular lane and then bids on the cost of shipping goods by air within that lane. Rather than being broken down by weight classes, the air shipment rates are broken down by ranges of volumes, such as from 1 to 22 cubic feet and 22 to 44 cubic feet. The dollar amount of the rate reflects how much the freight forwarding company is charging per cubic foot for that lane.

In addition to the cost of shipping goods, transferees often require that their goods be stored for long periods. Accordingly, the freight forwarding companies may also be permitted to bid on the costs of putting goods in permanent storage. As shown in FIG. 6, the freight forwarding company may select cities in which goods will potentially be stored and then the cost of putting the goods into storage based on weight class, the cost of taking the goods out of storage based on weight class, and the cost of storage based on weight and other flat fee charges. As with the shipment rates, the freight forwarding company can enter dates over which the rates are effective.

In addition to charging for shipment and storage, freight forwarding companies may also charge for particular services. These assessorial charges may include services such as moving a grand piano or obtaining a crane to move items to upper floors. In this regard, the method and system of the present invention also allow the freight forwarding company to bid on accessorial charges. This information may be entered via the use of the Internet as shown in FIG. 7. Preferably, each bid request identifies acceptable accessorial charges such as moving a "Piano-Grand". The request also identifies acceptable rate structures for the charge, such as whether the price needs to be based on a flat fee, weight (CWT), volume (CF), the freight forwarding company's cost plus a 10% surcharge, or some other unit of measure (UOM). As with the shipment and storage bids, the freight forwarding company may enter the effective dates of rates. Preferably, the assessorial charges are constrained to coincide with the effective dates of the freight forwarding company's shipment rates.

Preferably, the bidding process also requires that the freight forwarding company agree to abide by a variety of rules relating to the rates. Exemplary rules are attached as Exhibit A; the rules are often particular to the individual relocation company. The rules may be accepted, reaffirmed and changed at numerous points in the process, such as at contract signing and submission of new or changed rate information.

In one aspect of the invention, the bid is privacy protected, that is, no bidder can see another's bid. It is believed that a confidential bidding process not only preserves the privacy desired by the freight forwarding companies but also promotes fair and competitive bidding.

As noted above, the bid is not made in connection with a particular move but, rather, preferably reflects the freight forwarding company's agreement to fulfill future moves meeting predefined criteria at prices based on predefined rate structures.

Figure 8:
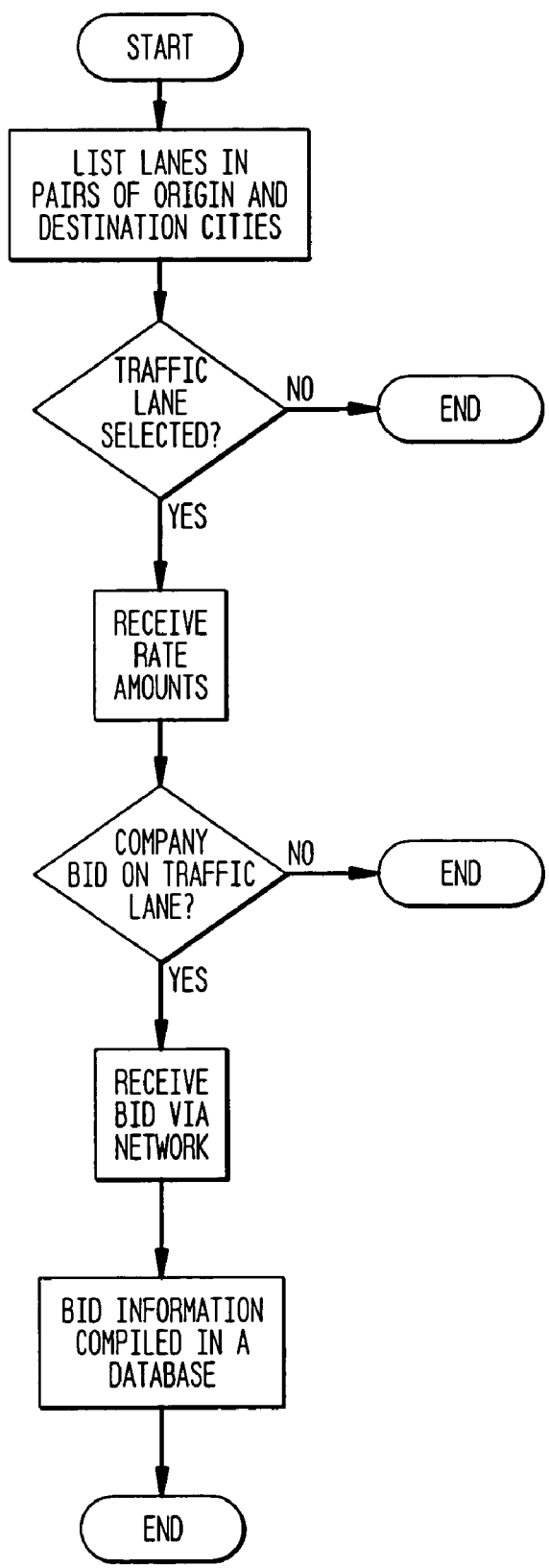
FIG. 8 is a flow chart illustrating a freight forwarding company bidding process according to one aspect of the invention.

In one aspect of the invention, the freight forwarding company can indicate an interest in a geographic region without bidding on it. For example, the freight forwarding company may identify whether they are willing or unwilling to provide services in a particular country. In this regard, a freight forwarding company may indicate that they are willing to provide services to or from England without actually bidding on lanes that include English cities. At the same time, the freight forwarding company may indicate that they are not willing to provide services to a particular geographic region. FIG. 8 is a flowchart illustrating a freight forwarding company bidding process according to one aspect of the invention. Note that this process can be implemented without a computer.

When a client of the relocation company wants assistance moving a particular person, they will contact the relocation company. A consultant for the relocation company will then call the transferee. The consultant will perform a needs assessment and analysis based on the customer's policies, the transferee's needs and the particulars of the move.

Once the relocation company's consultant obtains the information relating to the transferee and the move, the consultant will notify one of the relocation company's move specialists to book the move.

The specialist will then compile the relevant information pertaining to the move, such as the origin, destination, one or more moving requirements, and the quantity associated with each moving requirement. For example, the moving requirements may relate to the required type or types of shipments that will be necessary for the move, such as air, loose load surface shipments and lift van surface shipments. Other requirements may relate to storage and assessorial services. The quantity may relate to weight, volume or some other criteria that is associated with the moving requirement, such as how long the goods must be stored and whether a crane is required such as to remove a piano or other large object (e.g., no crane being considered a quantity of zero cranes). The specialist may also enter in other information, such as the date that the goods need to be shipped. The specialist then compares the compiled information with the bid information to select the best freight forwarding company for the move.

In one aspect of the invention, the specialist will use the booking engine to search the booking engine database and rank the bids. For example, the specialist may enter a number of different search criteria, such as the origin, destination, weight, dates and other information into a computer. The computer then accesses the booking engine, which in turn queries the database for bids which match the criteria.

As shown in FIG. 9, the booking engine may provide the specialist with information on various forwarders, including how much each freight forwarding will charge. Specifically, the names of the freight forwarding companies are listed in the "Forwarder" column. The "Air", "LL" and "LV" columns reflect a calculated value based on the price that the freight forwarding company has bid for the transportation mode and the quantity of goods to be shipped via that transportation mode. The subtotal column reflects the total cost of the shipment. The "Perm Str" column similarly reflects a calculated value reflecting the freight forwarding company's charges for permanently storing the goods to be stored. The "Total" column reflects the shipment costs and permanent storage costs. Optionally, the total may also include any assessorial charges in the event assessorial services are required.

The invention may also provide the ability of storing information relating to the quality of services provided by the freight forwarding companies. The quality may be quantified based on subjective and objective criteria.

For example, in the example of FIG. 9, the "Service Scores" columns represent how the freight forwarding company performed based on feedback forms completed by prior transferees. Based on a sliding scale where 1 represents a poor ranking and 8 represents an excellent ranking, the percentage represents the number of feedback forms having positive ratings (e.g., rankings from 5-8) divided by the total number of returned surveys. The scores are further broken down by how well the freight forwarding company scored with respect to the destination and origin cities particular to the move, the countries particular to the move, and all surveys. It is noted that while this information may be subjective with respective to the transferee's views, it is objective with respect to the relocation company because the relocation company merely compiles the results.

The "Claims" column of FIG. 9 also quantifies quality based on prior transferee's claims for damages. In this regard, the "Frequency" column represents a ratio of the number of times that claims have been made versus the number of insured shipments performed by the freight forwarding company. The number of shipments in the Frequency column may be limited to only shipments in the particular lane, all shipments in all lanes or shipments sharing an origin or destination with the current move. Moreover, each different transportation type in a move (e.g., air, surface loose load, surface lift van) may be considered a separate shipment. The "Severity" column represents the average amount of claims that have been awarded against the freight forwarding company, and may be limited in a manner similar to or different from the frequency column.

Based on the returned cost and quality information, the specialist can make an informed choice of the best forwarder for a move. To aid the specialist in its task, the specialist may rank the freight forwarding companies by different columns. Optionally, the bids may be ranked based on a single, calculated value which takes the total cost and service as the parameters.

If no vendor has bid on the selected channel, then the system may optionally use other information to suggest freight forwarding companies. For example, a list may be compiled of all of the companies that have indicated a willingness to provide services in the origin and destination regions. These companies may then be contacted, either manually or by an automatic email from the booking engine, to enter bids on the lane.

Figure 10:
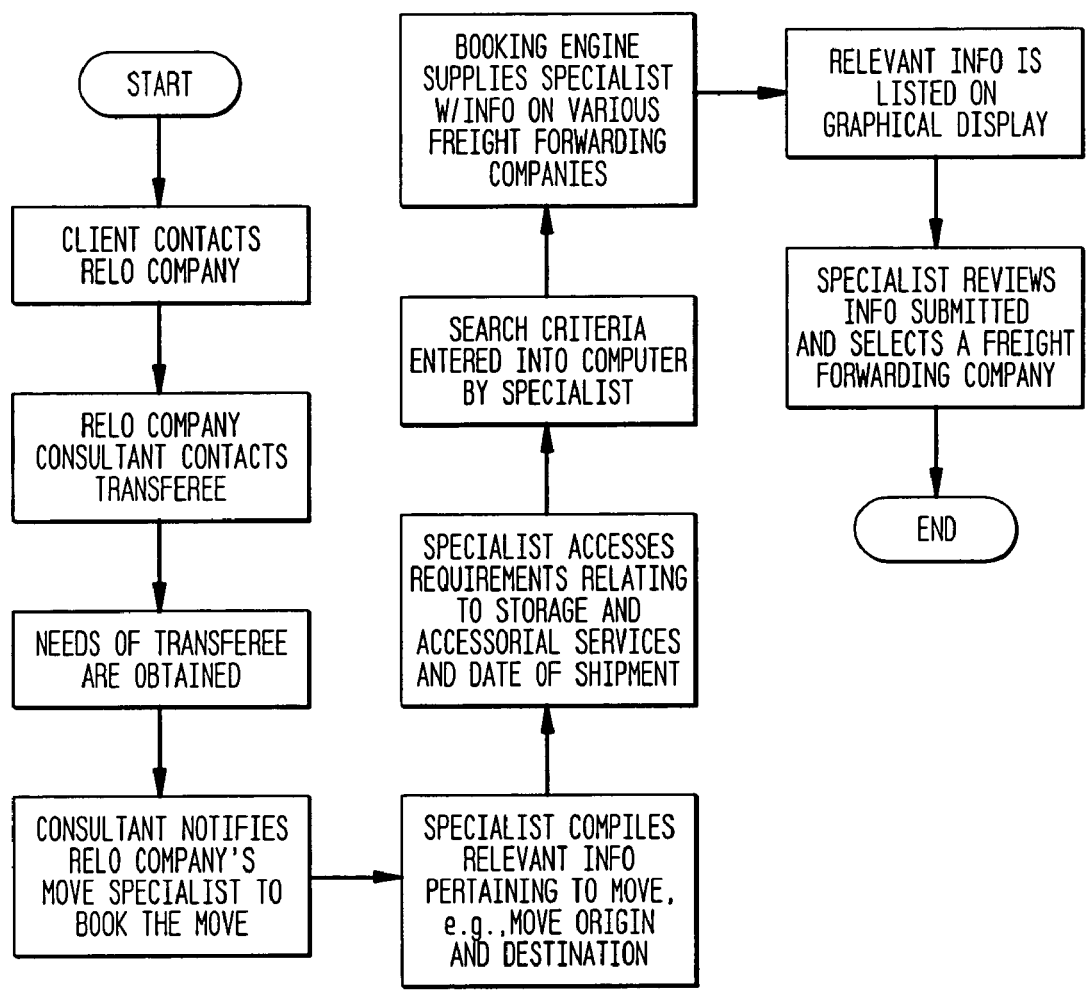
FIG. 10 is a flow chart illustrating one aspect of a freight forwarding company selection process according to the invention.

After the relocation company selects the freight forwarding company, the move specialist will then notify the freight forwarding company of the decision. The freight forwarding company, in turn, will call or otherwise contact the transferee and conduct a survey. The freight forwarding company will also work with the relocation company as well as the transferee to coordinate and execute the move. FIG. 10 is a flow chart illustrating one aspect of a freight forwarding company selection process according to the invention. Note that this process can be implemented without the use of a computer.

Once the move is completed, the freight forwarding company will send the relocation company an invoice and backup documentation, such as proving that the move was completed and other information, to the relocation company. Before paying the invoice, the freight forwarding company is preferably audited to ensure that it has complied with the rate rules, other contractual requirements and industry rules. It is also preferably audited for accuracy and completeness of the documentation. The cost of the move may be invoiced in two portions, one occurring after the shipment leaves the port and the other upon delivery.

Different aspects of present invention provide a number of different advantages. In one aspect, it promotes cost management, because it increases control over costs and quality.

The bidding process also allows the relocation company to leverage the advantage of using multiple competitive vendors. By asking vendors to bid in advance, rather than move-by-move, the vendors have an incentive not to overcharge the relocation company because of the likelihood that overbidding will result in continuous non-selection.

Moreover, by quantifying quality, the relocation company can insure that under performers are not awarded moves. In addition, the specialist can use the quality information to reflect the customer's needs. For example, one customer may accept somewhat lower quality, particularly if it results in the price being lower. Another customer may require the highest quality at any reasonable price.

The use of the system further allows the relocation company to manage its information more effectively.

Aspects of the system also provide advantages to the customers' beyond price. The system provides faster supplier selection because bids are entered in advance and the information necessary to award the move is already in the system; it is no longer necessary to wait for bids to come back on each individual move. Moreover, as noted above, the clients' priorities (i.e., quality or cost) can be taken into account in forwarder selection. The system also prevents transferees from having to deal with multiple surveyors because a single freight forwarding company is selected based on pre-existing information. The system also provides the customer with effective control, because the employee can evaluate the mover's performance and this assessment will be entered into the system. As noted above, overall customer satisfaction can be tracked by city, country and worldwide, so that future choices can be based on very specific performance metrics. Claims experience may also be stored in the system.

The system also provides benefits to the freight forwarding companies. For example, it creates a fair playing field because it allows the relocation company to choose the forwarder entirely on the basis of objective factors, such as price and service performance, and not for any other reason. In this regard, forwarders will be motivated to play to their strengths, that is, offer the best prices in the lanes where they have the most volume and ability to offer high quality services. The system will also enable them to be strategic, focusing on lanes and weight ranges in areas where they want to grow. Even a smaller forwarder can bid on business that might be out of their usual scope, because as long as their pricing and service are competitive, they are likely to be selected.

Indeed, since preferably all of the approved freight forwarding companies can bid on a lane, the process is more competitive than simply consulting two or three companies as typically occurs in prior art systems. It is also less labor intensive for the freight forwarders than the old process, since multiple surveys are not required.

Another advantage to relocation company and freight forwarding companies alike is that all of the companies are preferably required to bid in accordance with the same set of rules. This provides a level playing field for the freight forwarding companies and it minimizes surprise fees for the relocation company.

Another advantage of one aspect of the present invention is its flexibility. For example, although the invention is preferably implemented automatically via a web-based application, it may also be implemented manually. For example, communication may take place by voice over phone rather than by network access, and the information need not be stored in computer-implemented databases. It can also take place using faxed solicitations and bids.

The system, including the booking engine, may provide other administrative functions as well. For example, it may place a six-month time limit on rates such that rates are no longer considered valid if they have not been changed or confirmed within the last six months. It may also conduct routine post-payment audits of bills to track and trend compliance with rates in the program.

Unless stated to the contrary, use of words such as "including," "containing," "such as," "comprising" and the like, means "including without limitation" and shall not be construed to limit any general statement that it follows to the specific or similar items or matters immediately following it.

References to a "plurality" of things means at least two of the things, and, unless stated to the contrary, reference to "a" or "one" thing does exclude the possibility of using a plurality of such things.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method of identifying a bid of a freight forwarding company comprising:
   receiving a plurality of bids, each bid being associated with a traffic lane, a potential requirement for a move, a price rate associated with the potential requirement for a move, and a freight forwarding company, at least two of said plurality of bids being associated with different freight forwarding companies,
   receiving, after receiving the plurality of bids, a move request associated with a traffic lane, a moving requirement and a quantity value associated with the moving requirement,
   identifying a plurality of bids by comparing the traffic lane and the potential requirement of the received bids with the traffic lane and the moving requirement of the move request, and
   calculating a cost for each of the identified bids dependant on the price rate and quantity value.

2. A method of identifying a bid received from a freight forwarding company as recited in claim 1 wherein said plurality of freight forwarding companies meet approval criteria prior to submitting bid information.

3. A method of identifying a bid received from a freight forwarding company as recited in claim 1 wherein said freight forwarding companies submit bids pursuant to a contract for providing services.

4. A method of identifying a bid received from a freight forwarding company as recited in claim 1 wherein said bid is subject to being invalidated after a predetermined period of time, said period of time being set by an entity other than said freight forwarding company.

5. A method of identifying a bid received from a freight forwarding company as recited in claim 1 wherein said bid is selected using criteria which includes the calculated cost and the past performance of the freight forwarding company associated with the bid, the past performance being stored in a computer.

6. The method of claim 1 further comprising selecting one of the bids from among the plurality of identified bids based on the calculated costs of the identified bids.

* * * * *

UNITED STATES PATENT AND TRADEMARK OFFICE
Certificate

Patent No. 8,131,598 B2                                                                       Patented: March 6, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gregory Goolkasian, Southbury, CT (US); and Mark Olsen, Longmont, CO.

Signed and Sealed this Nineteenth Day of February 2013.

WU-CHENG WINSTON SHEN
*Supervisory Patent Examiner*
Art Unit 1621
Technology Center 1600

UNITED STATES PATENT AND TRADEMARK OFFICE
Certificate

Patent No. 8,131,598 B2                                                                 Patented: March 6, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gregory Goolkasian, Southbury, CT (US); and Mark Olsen, Longmont, CO (US)

Signed and Sealed this Nineteenth Day of March 2013.

JEFFREY A. SMITH
*Supervisory Patent Examiner*
Art Unit 3625
Technology Center 3600

UNITED STATES PATENT AND TRADEMARK OFFICE
CERTIFICATE OF CORRECTION

| | | |
|---|---|---|
| PATENT NO. | : 8,131,598 B2 | Page 1 of 1 |
| APPLICATION NO. | : 10/819813 | |
| DATED | : March 6, 2012 | |
| INVENTOR(S) | : Gregory Goolkasian and Kevin Kelleher | |

It is certified that error appears in the above-identified patent and that said Letters Patent is hereby corrected as shown below:

In the Specifications:

Column 3, lines 6-7, "to the customers'" should read -- to the customers --.

In the Claims:

Column 10, line 1, "identifying" should read -- electronically identifying --.

Column 10, line 5, "dependant" should read -- dependent --.

Column 10, line 21, "includes" should read -- include --.

Signed and Sealed this
Twenty-first Day of May, 2013

Teresa Stanek Rea
*Acting Director of the United States Patent and Trademark Office*